United States Patent [19] [11] 3,921,359
Brichard et al. [45] Nov. 25, 1975

[54] MULTIPLE-PANE GLAZINGS

[75] Inventors: Edgard Brichard, Jumet; Michel Lambert, Brussels, both of Belgium

[73] Assignee: Glaverbel S.A. Secretariat Technique, Brussels, Belgium

[22] Filed: Nov. 17, 1971

[21] Appl. No.: 199,652

[30] Foreign Application Priority Data
Nov. 27, 1970 Luxemburg............................ 62150

[52] U.S. Cl. ................. 52/616; 52/172; 52/304; 52/620
[51] Int. Cl.² ..................... E04C 2/54; E04B 2/28
[58] Field of Search ............ 52/171, 172, 616, 620, 52/304

[56] References Cited
UNITED STATES PATENTS

| | | | |
|---|---|---|---|
| 2,303,897 | 12/1942 | Smith | 52/172 |
| 2,597,097 | 5/1952 | Haven | 52/172 |
| 2,618,819 | 11/1952 | Goodwillie | 52/616 |
| 2,838,810 | 6/1958 | Englehart et al. | 52/172 |
| 3,001,249 | 9/1961 | Elton et al. | 52/172 |
| 3,314,204 | 4/1967 | Zopnek | 52/616 |

FOREIGN PATENTS OR APPLICATIONS

| | | | |
|---|---|---|---|
| 1,904,907 | 8/1970 | Germany | 52/172 |
| 796,249 | 6/1958 | United Kingdom | 52/616 |
| 1,534,834 | 7/1969 | Germany | 52/616 |
| 537,912 | 7/1941 | United Kingdom | 52/616 |

Primary Examiner—Ernest R. Purser
Assistant Examiner—Leslie A. Braun
Attorney, Agent, or Firm—Spencer & Kaye

[57] ABSTRACT

In a multiple glazing composed of two or more transparent sheets joined together by a soldered connecting strip, a spacing member is mounted between sheets adjacent the strip to support deforming compression forces between the sheets and preserve the seal provided around the peripheral region between the sheets.

6 Claims, 15 Drawing Figures

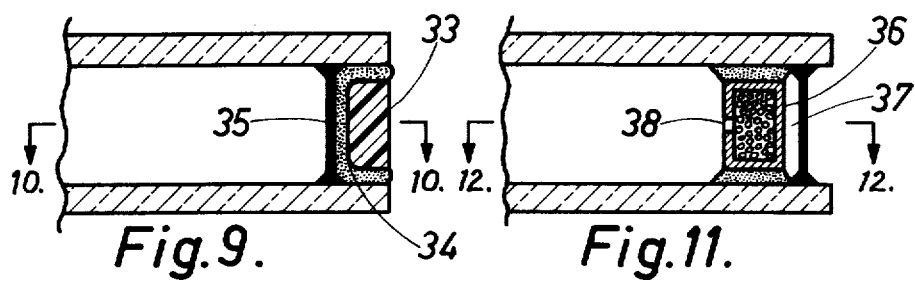
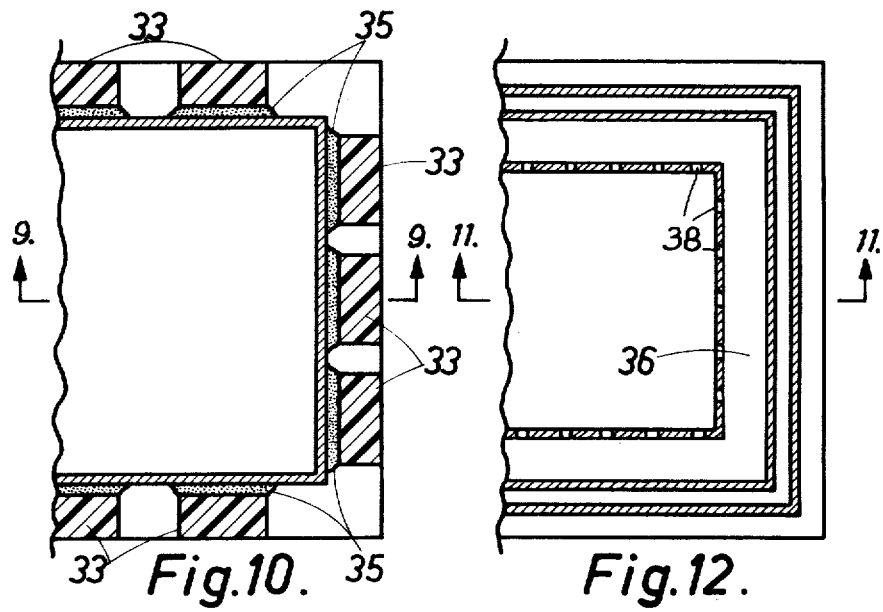
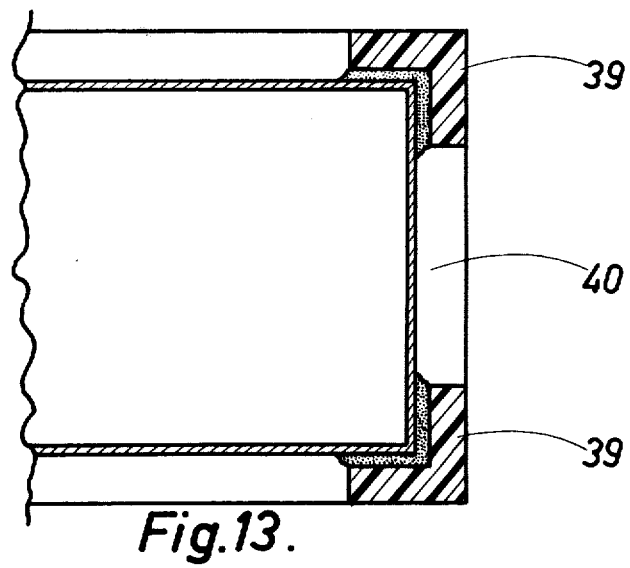

MULTIPLE-PANE GLAZINGS

BACKGROUND OF THE INVENTION

The present invention relates to a multiple glazing composed of at least two sheets of glass assembled by welding via at least one metal ribbon.

A multiple glazing of this type is made, for instance, by soldering a joint made of lead to the peripheral marginal zone of one of the two sheets of glass, such zone having a coating of tinned copper. The second sheet, whose peripheral marginal zone has also been given a tinned copper coating on the surface facing the first sheet, is then applied to the joint so that the two sheets of glass preferably register exactly with one another, whereafter the second sheet of glass is soldered to the lead joint.

When a multiple glazing of this type is glazed in a frame, the glazing is subject to various stresses. For instance, wind pressure makes the sheets of glass bend to a certain extent. Unequal expansion of the two sheets of glass as a result of differences in their temperature may cause the edges of the sheets to move in relation to one another. Moreover, the difference between the pressures at the inside and outside of the glazing makes the sheets of glass bend. All those deformations have an adverse effect on the joint.

Glazings of the kind specified are currently glazed in sectional members made of polymeric materials, for instance neoprene, and some clamping pressure must be applied to give the joint between the glazing and the frame satisfactory sealing tightness.

This further force is transmitted to the multiple glazing and considerably increases the stresses to which the interposed ribbon is subjected, and may give rise to the buckling of the ribbon. The buckling reduces the thickness of the glazing, causing loss in the sealing tightness of the neoprene joint. Moreover, in the long run, any substantial increase in the deformations of the metal joint may produce cracks in the joint, causing fogging inside the glazing.

SUMMARY OF THE INVENTION

It is an object of the present invention to obtain an improved multiple glazing capable of better withstanding the various stresses to which it is subjected which makes it possible to obtain a tighter seal.

The glazing according to the invention is composed of a spacing member between the two sheets of glass adjacent the metal ribbon.

The term spacing member here means a member which has some rigidity and prevents the sheets of glass from moving towards one another, without necessarily exerting on the sheets any force tending to move them apart. The term will be used with this meaning throughout the present text.

The introduction of the spacing member into the space between the two sheets of glass in a multiple glazing enables the pressure exerted by the frame on the edges of the glazing to be absorbed, thus preventing the metal ribbon from buckling. It also substantially reduces deformations due to other stresses, such as the bending of the glass around the welding fillet and relative displacement of the edges of the sheets of glass in their plane.

The spacing member can be easily introduced in a very versatile manner. For instance, with a multiple glazing composed of an interposed welded ribbon and having a groove at its outer periphery, it is advantageous, according to the invention, to introduce the spacing member into such groove. This can be done when the multiple glazing has been assembled.

As a result, the assembly process itself does not have to be modified.

The spacing member can also be introduced into the glazing adjacent the metal ribbon during the assembly of the multiple glazing, the operation being performed just before the assembly of the second sheet of glass. This procedure is also part of the invention.

In a preferred embodiment of the invention, the spacing member takes the form of a continuous ribbon.

The ribbon may extend completely around the peripheral groove of the glazing and its ends may be connected together in a known manner. In this case, the ribbon retains itself in the groove without any other attaching means. The ribbon may be made of copper.

The continuous ribbon may advantageously have a corrugated shape and this will increase the resistance of the glazing to crushing.

In another embodiment of the invention, the spacing member can be advantageously made of several distinct members disposed at intervals along the interposed ribbon.

Such members may, for instance, have a rectangular cross section or any other suitable shape and the material of which they are made is at least as rigid as the hermetic sealing joint. For instance, a metal can be used, more particularly copper, as can wood, certain plastics, etc. Such members are inserted into the space between the two sheets of glass adjacent the welded joint, either outside or inside the glazing.

The spacing member is preferably inserted freely between the sheets of glass.

In order to retain the spacing member in place during further handling of the glazing, a connection between the spacing member and the glazing can be advantageously made.

In an advantageous embodiment, the spacing member is locally attached to the metal ribbon. The adhesion can be achieved by soldering to the ribbon, which soldering can be local.

According to the preferred embodiment, the metal ribbon and the spacing member form a single section. In this case, there will be used, for instance, a section one portion of which acts as a joint, while the other portion, which is slightly shorter, acts as the spacing member. It can, for instance, take the form of a double T or a ribbon provided with flanges disposed perpendicularly to the ribbon.

According to an advantageous embodiment, the member is glued between the sheets of glass, for instance, with a suitable adhesive.

When the spacing member takes the form of a ribbon, whether corrugated or not, it is preferably made of copper.

The spacing members may have a hollow rectangular section. In one particular form of this embodiment of the invention, the spacing member can perform the extra function of containing a dessicating material. To this end, the hollow section is arranged to communicate with the internal space of the glazing via perforations provided in the wall of the spacing member facing the internal space of the glazing.

Finally, besides the glazing itself, the invention relates also to a glazed construction element in the form of a multiple glazing composed of at least two sheets of glass assembled by soldering by means of a metal ribbon, and a frame in which the multiple glazing is placed, the element also including at least one spacing member located between the two sheets of glass adjacent the metal ribbon.

The spacing member is preferably attached to the frame or is a part of the frame.

BRIEF DESCRIPTION OF THE DRAWINGS

FIG. 9 is a cross-sectional view of another embodiment of the invention taken along line 9—9 of FIG. 10.

FIG. 10 is a cross-sectional view taken along the line 10—10 of FIG. 9.

FIG. 11 is a cross-sectional view of another device according to the invention taken along the line 11—11 of FIG. 12.

FIG. 12 is a cross-sectional top view of the device shown in FIG. 11 taken along the line 12—12 of FIG. 11.

FIG. 13 is a cross-sectional top view of another embodiment of the invention.

DESCRIPTION OF THE PREFERRED EMBODIMENTS

Figures 1, 3:
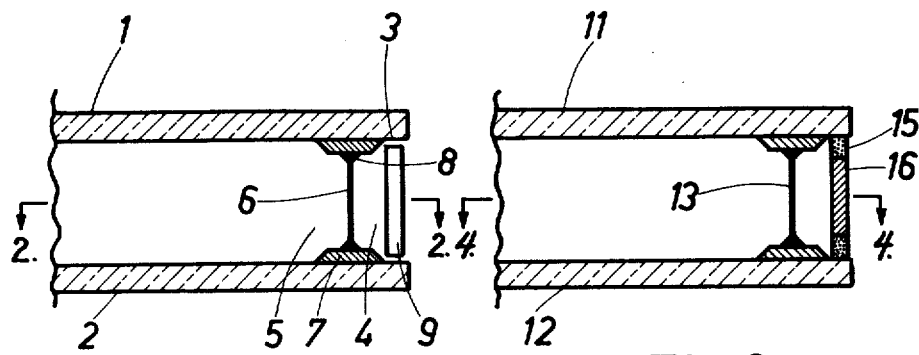
FIG. 1 is a cross-sectional view of part of a multiple glazing according to the invention, taken along the line 1—1 of FIG. 2.
FIG. 3 is a cross-sectional view illustrating another embodiment of the invention, taken along the line 3—3 of FIG. 4.
Figures 2, 4:
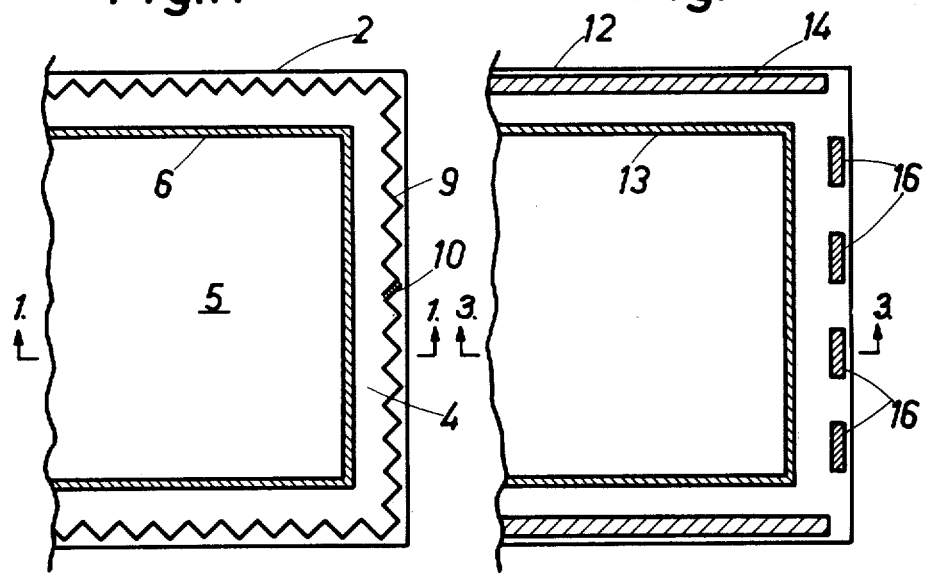
FIG. 2 is a cross-sectional view taken along the line 2—2 of FIG. 1.
FIG. 4 is a cross-sectional view taken along the line 4—4 of FIG. 3.

Referring to FIGS. 1 and 2, two sheets of glass 1 and 2 of a double glazing are coated over the marginal zones 3 of their inwardly facing major surfaces with a layer 7 of tinned copper. An interposed lead ribbon 6 is then soldered or welded to the layer 7, resulting in fillets 8, so as to form with the edges of the sheets of glass two grooves 4 and 5 directed toward the outside and inside of the multiple glazing, respectively.

A spacing member 9 constituted by a corrugated copper ribbon is disposed along the periphery of the groove 4. The ends 10 of copper ribbon 9 are connected in any suitable known manner, as indicated in FIG. 2. The ribbon 9 is placed freely in the groove 4 and retained in place exclusively by the closure of the ribbon 9 on itself at ends 10, as shown in FIG. 2.

During the occurence of various simultaneous forces such as those described above, tending to produce deformations of the completed glazing, the spacing member opposes and nullifies the deformation of the glazing and makes it possible to better maintain the tightness of the neoprene joint by means of which the glazing is placed in a frame. As a result, the behavior of the lead ribbon 6 is considerably improved.

FIGS. 3 and 4 show another embodiment of a multiple glazing of the same kind as that illustrated in FIGS. 1 and 2 and composed of two sheets of glass 11 and 12 assembled together, by soldering or welding, by means of a lead ribbon 13. The spacing member is constituted either by a continuous solid rod 14, as shown in FIG. 4, of rectangular section which is inserted and glued to the glass in the peripheral groove 4 of the glazing by means of a suitable adhesive 15, or by a series of small chocks 16 inserted and glued in the same manner. The only purpose of using the adhesive 15 is to retain the spacing member or members in place during subsequent handling of the multiple glazing.

The material used for this kind of spacing member can also be copper or, alternatively, other materials which are at least as rigid as the metal joint, such materials being wood, synthetic resins, etc.

If the spacing member is metallic, it can be united to the metal joint formed by ribbon 6 or 13 by soldering or welding it locally thereto. In the embodiment illustrated in FIG. 5a, the spacing member 17 is placed in groove 18, similar to groove 5 of FIG. 1, at the inside of the glazing and is soldered or welded to the metal joint 19 via a flat member 20. Use can also be made of a double T sectional member, one arm 19 of which is the conventional lead ribbon and the other arm 17, which is slightly shorter, acting as the spacing member. The use of such a sectional member requires no change in the assembly process but does simplify it by eliminating a soldering or welding step.

Figures 5A, 5B:
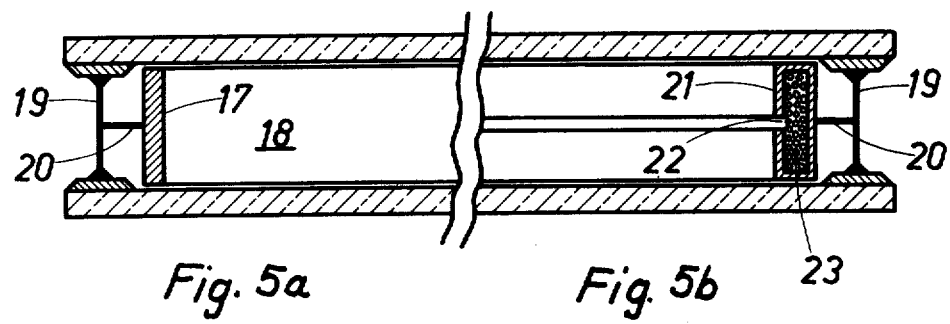
FIGS. 5a and 5b are cross-sectional views of further embodiments of the invention.

FIG. 5b shows another variant which uses a spacing member 21 having the form of a hollow box the inside surface of which is provided with a perforation in the form of a slot 22, and which contains a dessicating agent 23. Dessicating agents are well known in the art and any suitable commercially available material of this type can be used. The box 21 can also be soldered or welded locally to the lead joint by member 20 or be united therewith to form a single sectional member.

Figure 6:
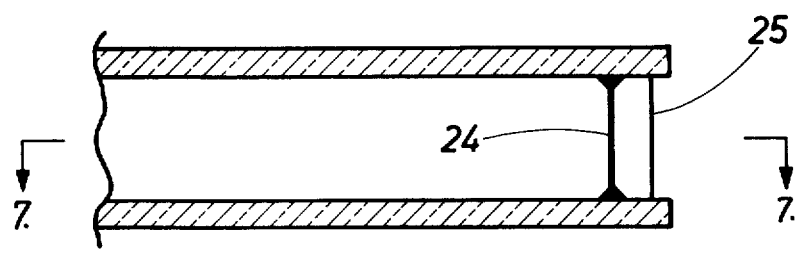
FIG. 6 is a cross-sectional view of another embodiment of the invention, taken along the line 6—6 of FIG. 7.
Figure 7:
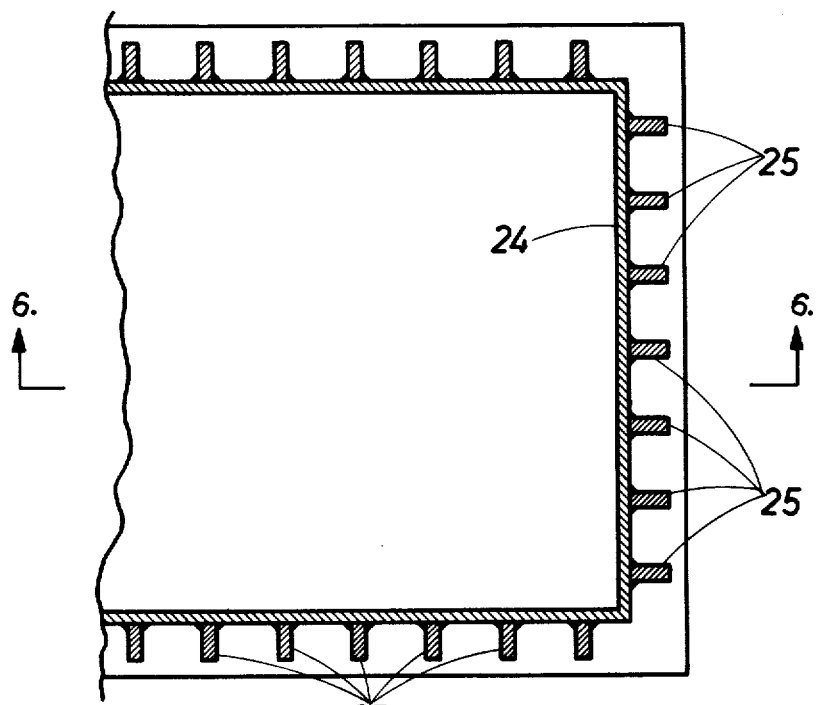
FIG. 7 is a cross-sectional view taken along line 7—7 of FIG. 6.

The interposed metal joint 24 shown in FIGS. 6 and 7 has at spaced intervals stiffening members 25 in the form of flanges disposed perpendicularly to the ribbon 24 and to the glass sheets. The flanges can either be soldered or welded to the ribbon 24 or can be made integral therewith.

Figure 8:
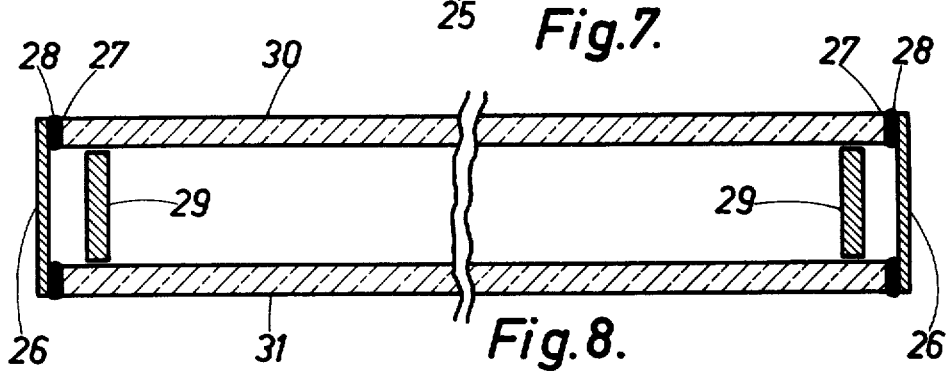
FIG. 8 is a cross-sectional view representing another embodiment of the invention.

FIG. 8 shows another kind of soldered multiple glazing in which the metal joint 26 is soldered to the metallized lateral edges 27 of the sheets of glass 30 and 31 via fillets 28.

As shown in FIG. 8, the spacing member 29 is freely placed in the space between the two sheets of glass 30 and 31 and the soldered metal joint 26, and adjacent the latter.

In order to retain the spacing member 29 in the correct position, it preferably is given the form of a complete closed frame.

As shown in FIGS. 9 and 10, the multiple glazing includes spacing members 33 distributed in the outer peripheral zone of the outside groove 34 of the glazing. The spacing members each have a shape which matches the groove 34 and they are glued in the groove 34 by means of a suitable adhesive 35, such as thiokol for instance. The members 33 are made of a plastic material such as, in the present case, polyvinyl chloride.

FIGS. 11 and 12 show a variant according to which the spacing member is a frame 36 formed by a hollow sectional member disposed along the peripheral marginal zone of the inside groove 37. The sectional member is glued to the two sheets of glass by a suitable adhesive. The sectional member surface facing the interior of the glazing is provided with orifices 38 and the hollow portion is filled with a dessicating material, such as silica gel, not shown in FIG. 10.

FIG. 13 shows a variant of the device shown in FIGS. 9 and 10 according to which four spacing members 39 are disposed one at each corner of the glazing in the outside groove 40, where they are glued by means for instance, of thiokol. The spacers 39 are solid bodies made of plastic and match the shape of the outer groove 40.

All the embodiments described above are readily adaptable to the kind of multiple glazing as well as to any other kind of multiple glazing, composed of at least two sheets of glass assembled by soldering via a metal ribbon.

Figure 14:
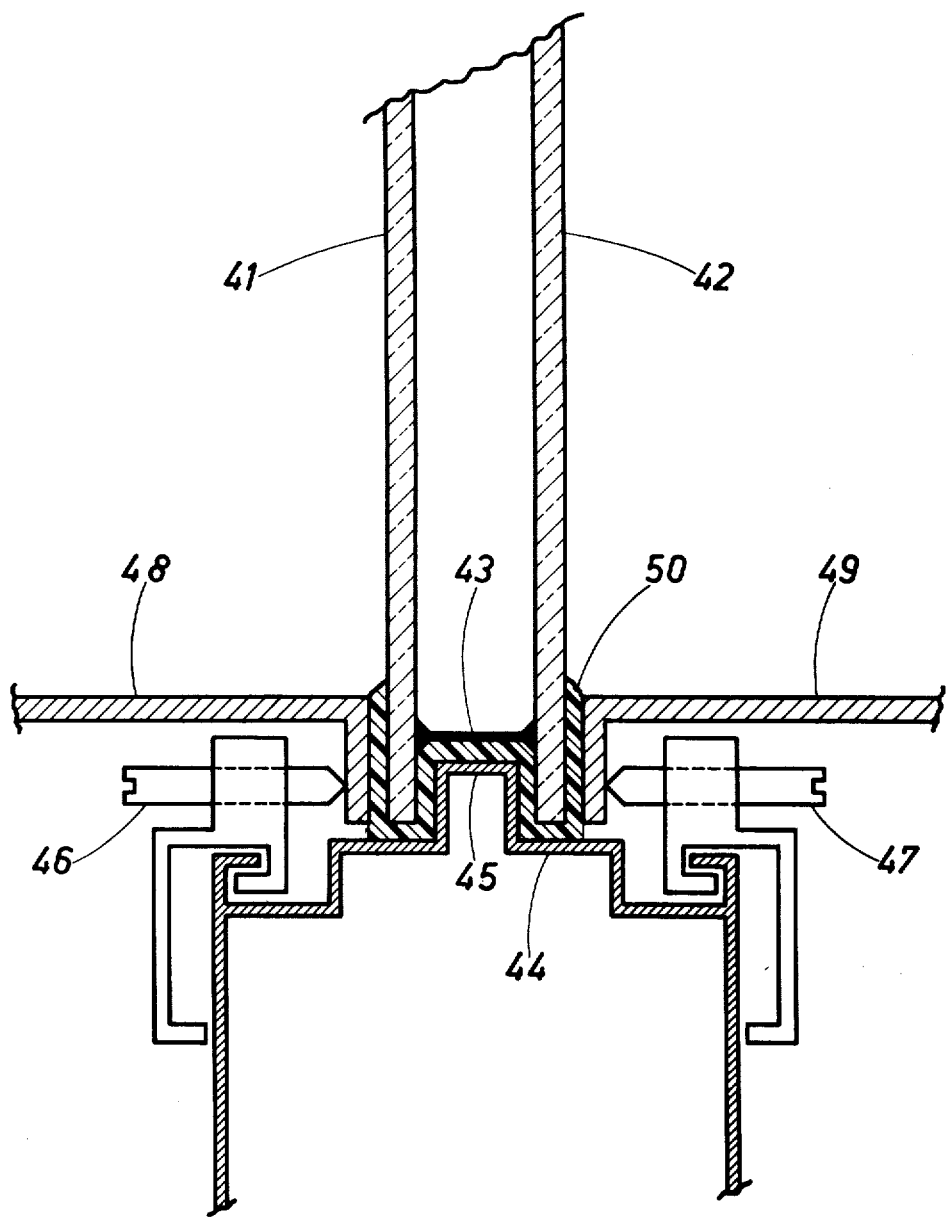
FIG. 14 is a cross-sectional view of a glazed construction element according to the invention.

FIG. 14 is a cross-sectional view representing, by way of example, the lower portion of a glazed construction member according to the invention. The multiple glazing is composed of two sheets of glass 41 and 42 assembled together by soldering via the metal ribbon 43.

The frame in which the multiple glazing is placed includes a main metallic sectional member 44 having a projecting portion 45 which constitutes the spacing member and which can be introduced into the outside groove formed by the margins of the sheets 41 and 42 and the metal ribbon 43.

The frame is of the pressure type, i.e. it is provided with members such as screws 46 and 47 which make it possible to exert a certain pressure on the margins of the glazing by means of movable members such as 48 and 49. An elastic joint 50 made of a plastic material, such as neoprene, is inserted between the glazing and the metallic parts 44, 45, 48 and 49 of the frame.

For such a construction element, the projecting member 45 need only be provided along the lower portion of the frame, on one hand in order to make the insertion of the glazing into the frame-recess easier and, on the other hand because it is only at the lower portion of the frame where it is essential to maintain a tight seal due to the streaming of water down the sheets 41 and 42. The highest sealing pressure should therefore be applied along a zone where the metal ribbon 43 is mainly stressed.

As described in the examples hereabove, the purpose of the projecting member 45 is therefore to absorb the various forces to which the metal ribbon 43 might be subjected.

Nevertheless the invention also includes a glazed construction element in which the frame would include a projecting member, or other spacing member, all along its peripheral zone. In this case, the glazed construction member should be manufactured and supplied ready to be placed into the building window opening.

It will be understood that the above description of the present invention is susceptible to various modifications, changes and adaptations, and the same are intended to be comprehended within the meaning and range of equivalents of the appended claims.

We claim:

1. In a multiple glazing composed of at least two sheets of glass and a metal ribbon positioned between and soldered to the sheets adjacent the edges thereof, to define a groove with the corresponding edges of the sheets, the improvement comprising a compression resisting spacing member disposed in said groove adjacent said ribbon, and outside the region enclosed by said ribbon, and between said two sheets of glass, said spacing member having the form of a continuous, corrugated ribbon and constituting means for absorbing pressures directed between said sheets and capable of deforming said ribbon, to thereby prevent said ribbon from being deformed when such pressures exist.

2. In a multiple glazing composed of at least two sheets of glass and a metal ribbon positioned between and soldered to the sheets adjacent the edges thereof, to define a groove with the corresponding edges of the sheets, the improvement comprising a compression resisting spacing member disposed in said groove adjacent said ribbon, and outside the region enclosed by said ribbon, and between said two sheets of glass, said spacing member having the form of a continuous copper ribbon and constituting means for absorbing pressures directed between said sheets and capable of deforming said ribbon, to thereby prevent said ribbon from being deformed when such pressures exist.

3. In a multiple glazing composed of at least two sheets of glass and a metal ribbon positioned between and soldered to the sheets adjacent the edges thereof, to define a groove with the corresponding edges of the sheets, the improvement comprising a compression resisting spacing member disposed in said groove adjacent said ribbon, and outside the region enclosed by said ribbon, and between said two sheets of glass, said spacing member constituting means for absorbing pressures directed between said sheets and capable of deforming said ribbon, to thereby prevent said ribbon from being deformed when such pressures exist, and said spacing member comprising a number of distinct elements disposed at intervals along said ribbon.

4. An arrangement as defined in claim 3 wherein said elements are constituted by flanges perpendicular to said metal ribbon.

5. In a multiple glazing composed of at least two sheets of glass and a metal ribbon positioned between and soldered to the sheets adjacent the edges thereof, to define a groove with the corresponding edges of the sheets, the improvement comprising a compression resisting spacing member disposed in said groove adjacent said ribbon, and outside the region enclosed by said ribbon, and between said two sheets of glass, said spacing member constituting means for absorbing pressures directed between said sheets and capable of deforming said ribbon, to thereby prevent said ribbon from being deformed when such pressures exist, and wherein said spacing member has a dimension, in its direction between said sheets, which is less than the distance existing between said sheets in the absence of forces urging said sheets together.

6. An arrangement as defined in claim 5 wherein said spacing member is glued between said sheets of glass.

* * * * *